United States Patent [19]

Jones et al.

[11] 3,838,412

[45] Sept. 24, 1974

[54] OPTICAL LINK FOR ILLUMINATED TRAVELING MESSAGE DISPLAY SIGN SYSTEM

[75] Inventors: Clifford M. Jones, Waynesboro, Va.; John D. Harnden, Jr., Schenectady, N.Y.

[73] Assignee: General Electric Company, Schenectady, N.Y.

[22] Filed: Sept. 5, 1972

[21] Appl. No.: 286,360

Related U.S. Application Data

[62] Division of Ser. No. 99,192, Dec. 17, 1970, Pat. No. 3,727,185, which is a division of Ser. No. 778,218, Nov. 22, 1968, Pat. No. 3,590,508, which is a division of Ser. No. 449,177, April 19, 1965, Pat. No. 3,432,846.

[52] U.S. Cl. ........... 340/334, 179/15 A, 179/15 BL, 250/199, 340/189, 340/203

[51] Int. Cl. ........................................... G08b 5/36

[58] Field of Search ...... 250/199; 179/15 A, 15 BL; 340/189, 190, 203, 334, 339

[56] References Cited

UNITED STATES PATENTS

| | | | |
|---|---|---|---|
| 2,123,459 | 7/1938 | Anderson | 340/339 X |
| 2,852,767 | 9/1958 | Foller et al. | 340/334 X |
| 3,243,592 | 3/1966 | Tomiyasu et al. | 250/199 |
| 3,401,385 | 9/1968 | Jaffe | 340/339 |

*Primary Examiner*—David L. Trafton
*Attorney, Agent, or Firm*—Louis A. Moucha; Joseph T. Cohen; Jerome C. Squillaro

[57] ABSTRACT

An optical link between display panels of an illuminated traveling message display sign system includes a time-share transmitter having an optical transmitter connected to the output thereof and an optical receiver located remote from the optical transmitter and a time-share receiver connected to the output thereof. The optical transmitter includes a light emitting diode and the optical receiver includes a photoelectric device for detecting the optical output of the optical transmitter and converting the detected output into serial electrical pulse form. The time-share receiver converts the output of the optical receiver to data in parallel electrical pulse form.

5 Claims, 17 Drawing Figures

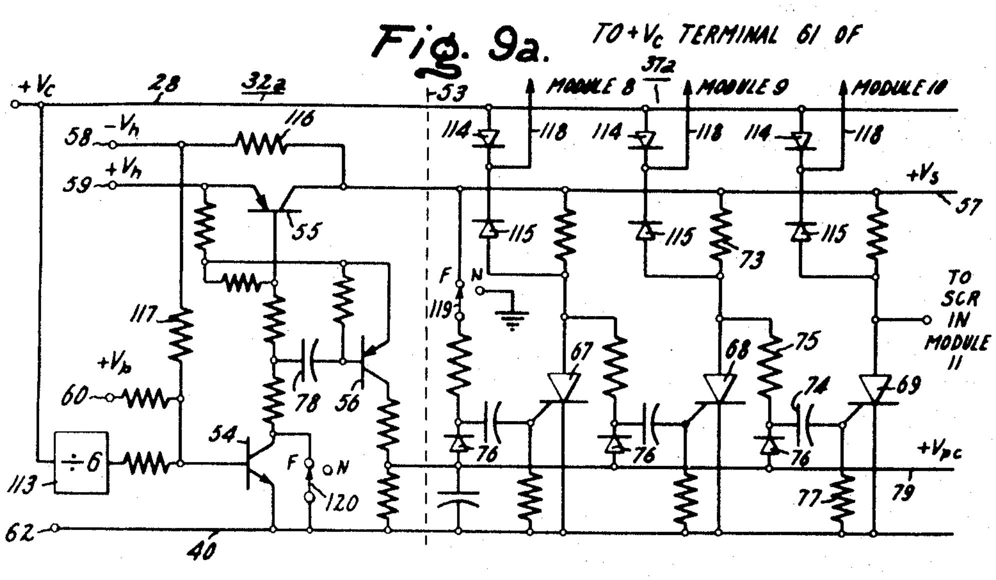
Fig. 9a.
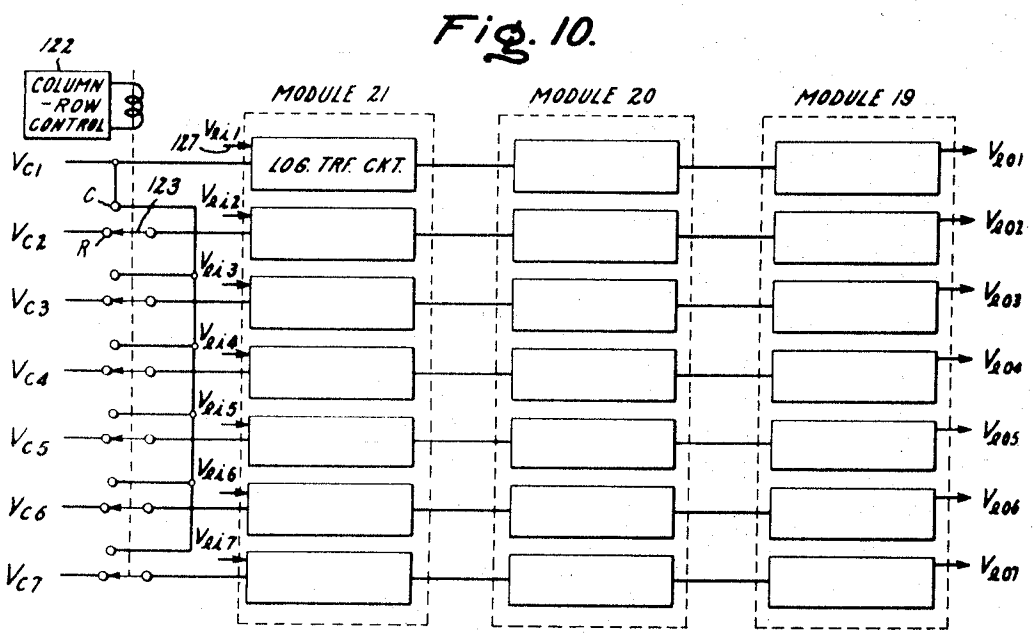
Fig. 10.
Fig. 9b.
MODULES
| 1 | 2 | 3 | 4 | 5 | 6 | 7 | 8 | 9 | 10 | 11 | 12 | 13 | 14 | 15 | 16 | 17 | 18 | 19 | 20 | 21 | |
|---|---|---|---|---|---|---|---|---|---|---|---|---|---|---|---|---|---|---|---|---|---|
| E | C | T | R | I | C | | G | X | O | | O | | D | Y | | | M | Z | O | | 9(b)1 |
| C | T | R | I | C | | | G | O | | O | | D | Y | | | M | Z | O | | R | 9(b)2 |
| T | R | I | C | | | | G | O | O | | D | Y | | | M | Z | O | | R | | 9(b)3 |
| | | | | | | | G | O | O | D | | M | O | R | N | I | N | G | | | 9(b)4 |
| | | | | | | G | | O | O | D | | M | O | R | N | I | N | G | | | 9(b)5 |
| | | | | | G | | O | | O | D | | M | O | R | N | I | N | G | | | 9(b)6 |
| | | | | G | | O | | O | | D | | M | O | R | N | I | N | G | | | 9(b)7 |
| | D | | | | M | | O | | R | | N | | I | | N | | G | | | | 9(b)8 |

OPTICAL LINK FOR ILLUMINATED TRAVELING MESSAGE DISPLAY SIGN SYSTEM

This is a division, of application Ser. No. 99,192, filed Dec. 17, 1970, now U.S. Pat. No. 3,727,185, which is a division of application Ser. No. 778,218, filed Nov. 22, 1968, and issued as U.S. Pat. No. 3,590,508, which in turn was a division of application Ser. No. 449,177, filed Apr. 19, 1965, and issued as Pat. No. 3,432,846.

Our invention relates to improvements in an illuminated display sign wherein the display presented on the sign may be of the moving or nonmoving type, and in particular, to improvements in the display sign described in our copending patent application Ser. No. 422,227 filed Dec. 30, 1964, now U.S. Pat. No. 3,384,888 entitled "Optical Apparatus" and assigned to the assignee of this application.

The above-identified U.S. Pat. No. 3,384,888 describes all solid-state device display signs which may be of the moving (traveling) message type, or the nonmoving but changing message type including time-temperature signs and scoreboards. Such patent includes embodiments of the basic solid-state electronic circuits forming the complete sign in addition to particular circuit features such as provision for varying speed of travel of the characters across the display sign from a maximum speed to a complete stop in a finite or infinite number of increments, variation of speed of travel control within sections of the display to obtain the optical effect of stretching or compressing of the characters, and a variation of lamp intensity from maximum brilliance to a dark condition.

The sign described in the above-identified patent includes a bank of electric lamps mounted in a desired arrangement of rows and columns on one or more interconnected display panel secitons or modules. The lamps are controllably illuminated in a desired sequence on a column-by-column basis to obtain a desired display on the sign. Each lamp is connected in circuit relationship with an associated solid-state device which, when in its conductive state, supplies electrical power to the associated lamp to cause illumination thereof. The particular state (conductive or nonconductive) of each solid-state device is controlled by an electronic circuit of the logic-transfer type connected in circuit relationship therewith, the logic transfer circuits associated with each particular row of lamps on one display panel section being serially connected to form what is known in digital computer technology as a shift register circuit. The logic utilized by the logic transfer circuits is generated by an information circuit which converts input information into electrical pulse form corresponding to the desired sequence of lamp illumination, the output of the information circuit being connected to an input of a first logic transfer circuit associated with each row of lamps on the first (extreme right end of the sign as viewed by an observer) display panel section. A second electronic circuit, having an output common to all of the logic transfer circuits on a display panel section, provides electrical signals for switching the logic from the logic transfer circuits associated with one column of lamps to the logic transfer circuits associated with the next successive column of lamps. An electronic clock circuit, having an output connected to an input of the second electronic circuit, determines the speed of logic switching between logic transfer circuits associated with adjacent columns of lamps.

The present patent application is directed to additional circuit features for producing other desired optical effects on the display sign. These additional features are not limited in their application to solid-state display signs, but may also be employed in other electrically or even mechanically controlled display signs as well as other logic memory devices.

Therefore, one of the principal objects of our invention is to provide new and improved circuits for use in logic memory devices.

Another object of our invention is to provide an improved system for controlling multiple remote apparatus with a single information channel.

A still further object of our invention is to provide a light emitting diode link as a data transmission system.

Another object of our invention is to provide an optional imput information circuit for direct entry of messages to be presented on a display sign.

Another object of our invention is to provide a circuit for circulating a particular message along a particular portion of the sign.

A further object of our invention is to provide a circuit for inverting the characters on the display sign.

A further object of our invention is to provide a circuit for obtaining negative writing on the sign wherein the characters comprise nonilluminated lamps on an illuminated lamp background.

Another object of our invention is to provide a circuit for causing motion of the characters on the display sign in a reverse direction.

A still further object of our invention is to provide a circuit for forming a message on the display sign for controlling illumination of the lamps on a row-by-row basis instead of the conventional column-by-column.

A further object of our invention is to provide a circuit for decreasing the tailing effects produced by the slow extinguishment of lamps in a travelling message display.

Another object of our invention is to provide a circuit for automatically stopping a travelling message at a particular point on the sign.

A further object of our invention is to provide a circuit for generating a new message while the old message is displayed on a nonmoving message sign.

A still further object of our invention is to provide a structure for separating the illumination effects of adjacent lamps on the sign and for providing cooling thereof.

Briefly stated, we provide a plurality of circuits for obtaining the hereinabove described objects of our invention. In particular, we provide several switching circuits for providing a direct entry of messages on the sign, for circulating a particular message along a particular portion of the sign, for inverting the characters on the sign, for obtaining negative writing on the sign, and for forming a message on the sign by controlling illumination of the lamps on a row-by-row basis. The switching circuits may be of the electronic or mechanical type.

Various of the electronic circuits described in the above-identified patent may be modified in accordance with our present invention for causing motion of the characters on the display sign in a reverse direction, for decreasing the tailing effects produced by slow extinguishment of the lamps, for stopping (freezing) a particular travelling message along a particular section of the sign, and for generating a new message while the old message is being displayed on a nonmoving message sign.

The structure of a cover member for the lamps on the sign provides both separation of the illumination effects of adjacent lamps and cooling thereof.

Finally, an electronic circuit including a light emitting diode obtains a wide bandwidth optical link which finds general application in data transmission systems and is illustrated specifically for controlling a second travelling message sign located remotely from a first sign.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawings, wherein like parts in each of the several figures are identified by the same reference characters, the same reference characters being employed for similar elements in FIGS. 1, 8, 9 and 11 as in corresponding FIGS. 2 through 4, 5 and 11 in the above-identified patent, and wherein:

FIG. 1 is a simplified block diagram of a display sign constructed in accordance with U.S. Pat. No. 3,384,888;

FIG. 2 is a block diagram of a light emitting diode optical link system for transmitting data;

FIG. 3*a* is a block diagram of the transmitter section of the light emitting diode optical link and FIG. 3*b* illustrates the timing sequence of electrical signals at various points in the transmitter;

Figure 6B:
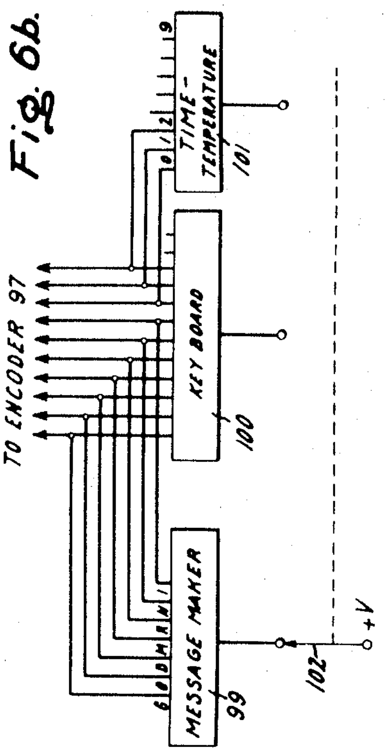
Figure 6A:
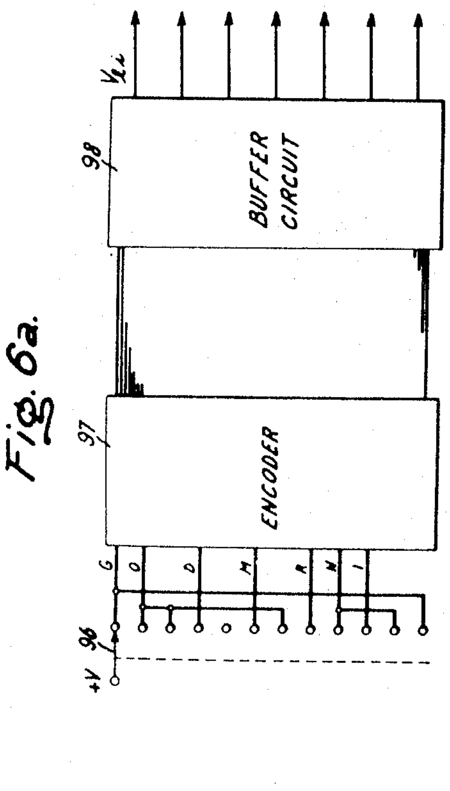
Figure 5:
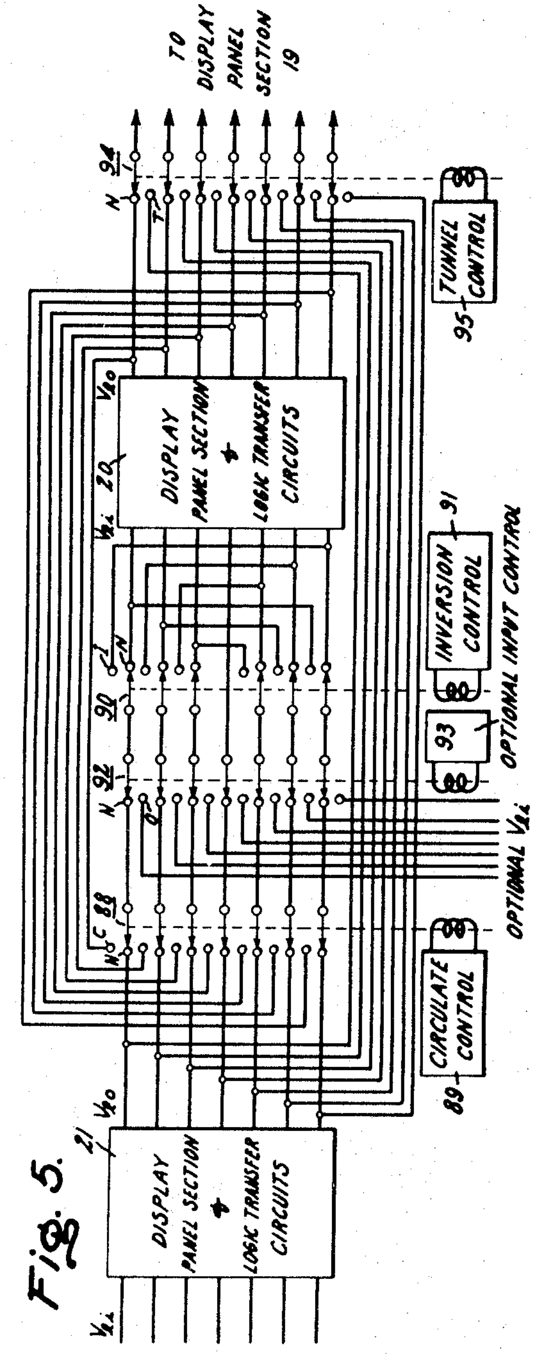
FIG. 5 illustrates a switching circuit diagram for obtaining circulation of a message along a particular portion of the sign, inversion of the characters comprising the message, and a disappearance or tunneling of a message at a first section along the sign and a reappearance of the message at a section further along the sign.
Figure 7:
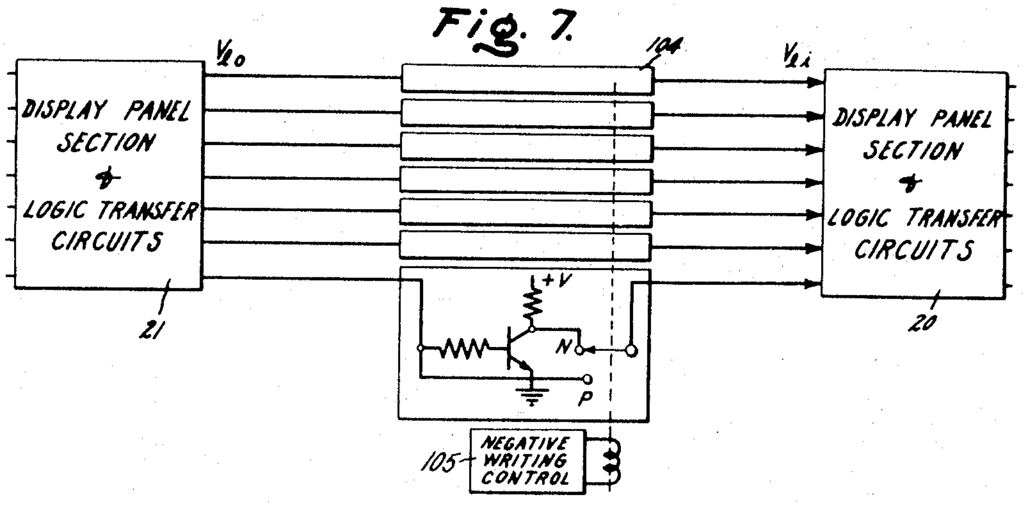
Figure 8:
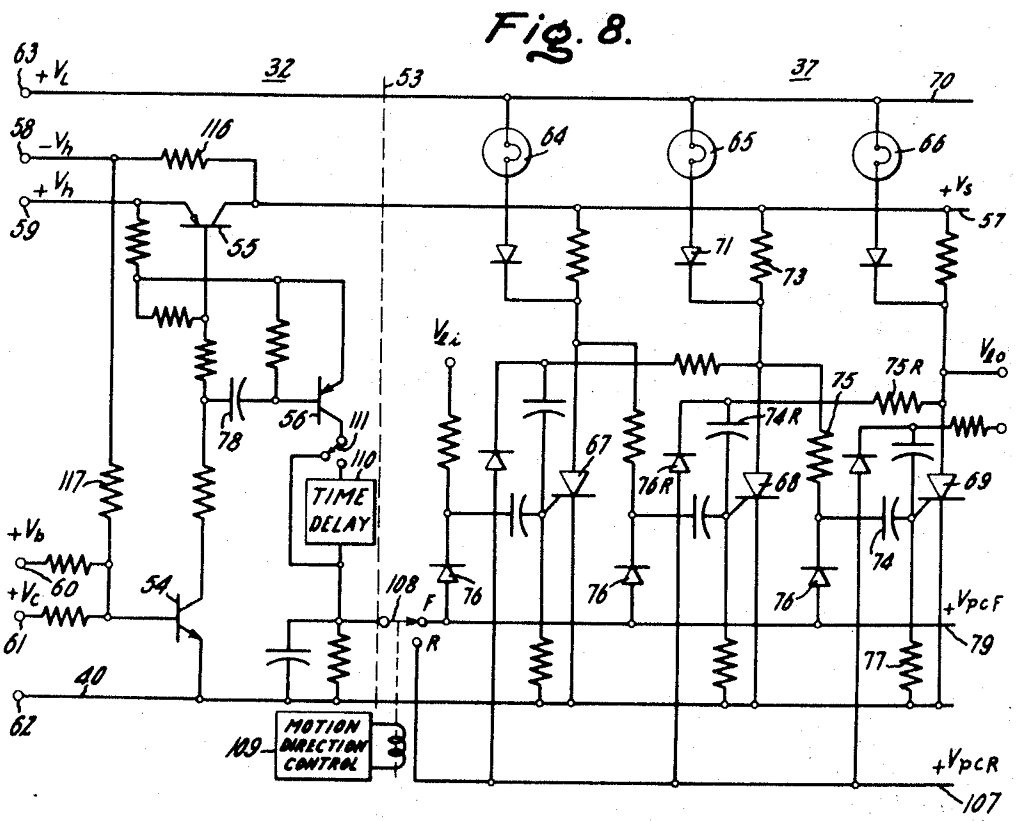
Figure 11A:
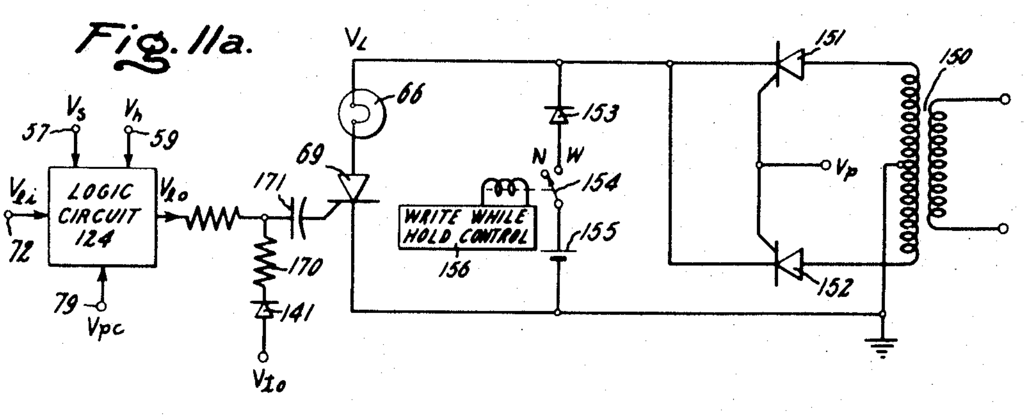
Figure 11B:
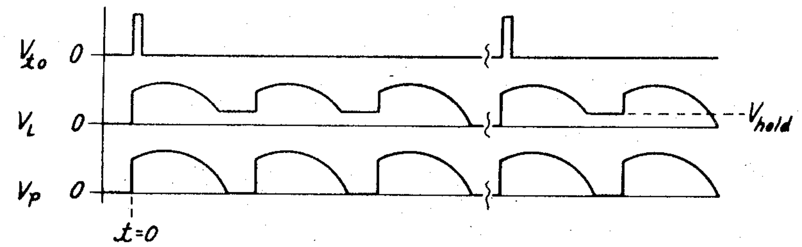
Figure 12:
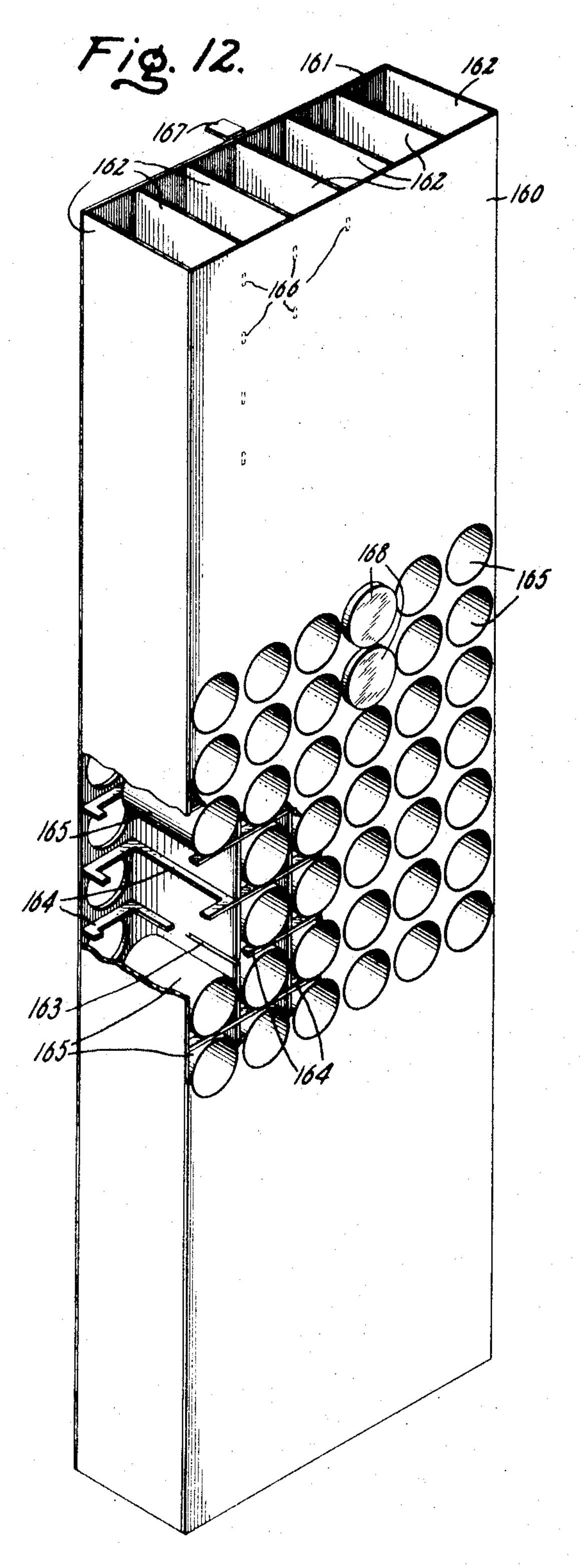

FIGS. 6*a* and 6*b*, respectively, illustrate switching circuit diagrams for single and multiple optional input information circuits which provide direct entry of messages at any elected portion of the sign as illustrated in FIG. 5;

FIG. 6 illustrates a switching circuit diagram for an optional input information circuit which provides direct entry of messages at any selected portion of the sign as illustrated in FIG. 5;

FIG. 7 illustrates a switching circuit diagram for obtaining negative writing on the sign wherein the characters comprise nonilluminated lamps on an illuminated lamp background;

FIG. 8 is a schematic diagram of a circuit for causing motion of the characters on the sign in a reverse direction and also for decreasing the tailing effects produced by slow extinguishment of lamps in a travelling message display;

FIG. 9*a* is a schematic diagram of a circuit for automatically stopping or freezing a particular travelling message along a particular section of the sign; and FIG. 9*b* illustrates such operation on a twenty-one module sign;

FIG. 10 is a switching circuit diagram for controlling illumination of the lamps on a row-by-row basis;

FIG. 11*a* is a circuit diagram for generating a new message while the old message is displayed on a nonmoving message sign and FIG. 11*b* illustrates the timing sequence of electrical signals at various points in the circuit; and FIG. 12 is a perspective view of a structure for separating the illumination effects of adjacent lamps on the sign and for providing cooling thereof.

Figure 1:
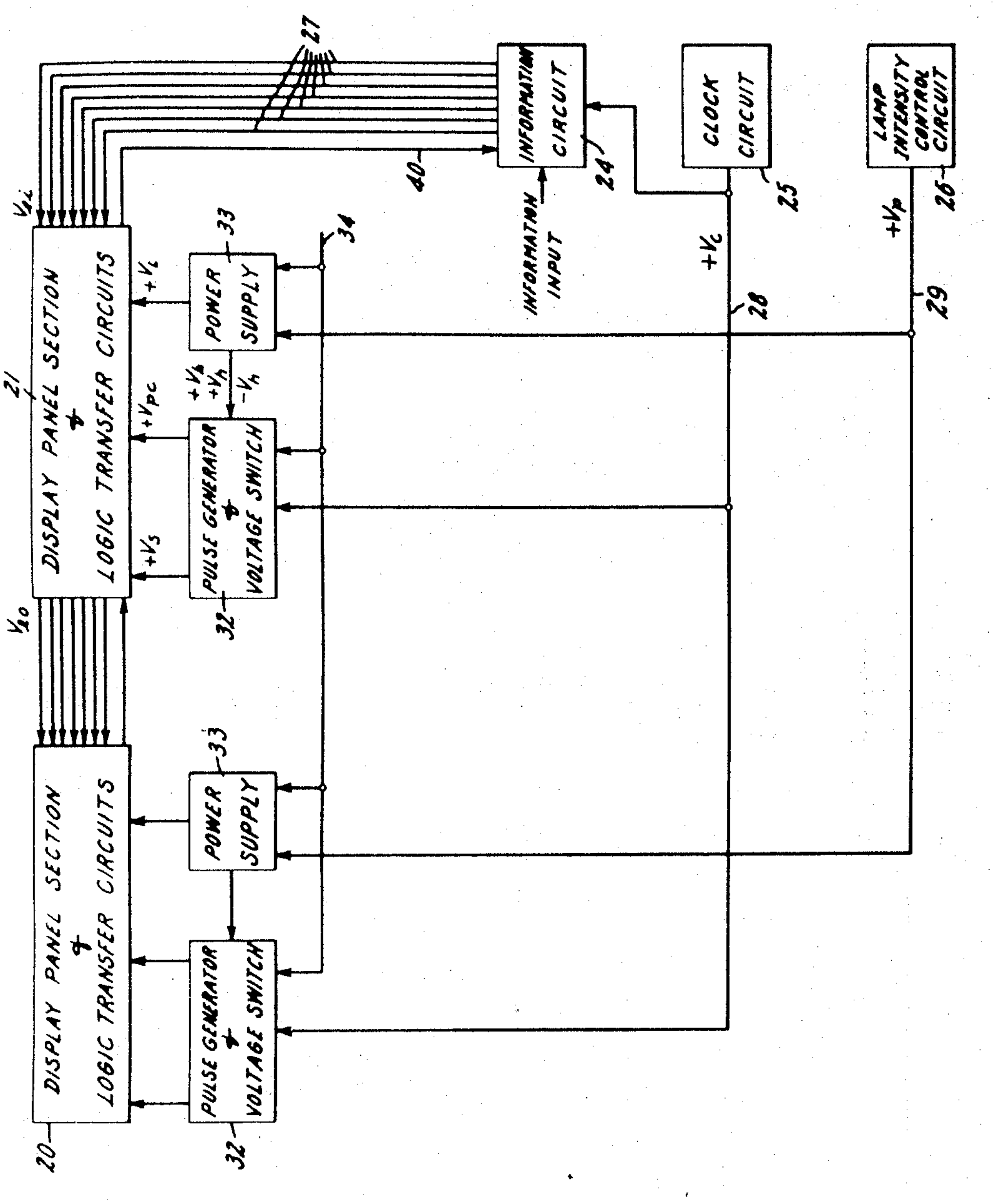

Referring now to FIG. 1 there is shown a simplified block diagram of an illuminated display sign which is described in detail in the above-identified U.S. Pat. No. 3,384,888. Reference is made to U.S. Pat. No. 3,384,888 for the details of the specific components that comprise the sign, but for convenience, the following summary of an illuminated travelling message sign is provided. For exemplary purposes only, the sign is illustrated in FIG. 1 as comprising two serially connected display panel sections 20, 21 upon which are mounted a bank of predetermined number of lamps in a desired arrangement of rows and columns. The lamps are controllably illuminated in a desired sequence on a column-by-column basis to obtain a desired optical display or message on the sign. In the particular embodiment of the sign installed in the General Electric Progressland Pavilion at the 1964–65 World's Fair, each lamp is connected in circuit relationship with a solid-state controlled conducting device which, when in its conductive state, supplies electrical power to the associated lamp to cause illumination thereof. The particular state (conductive or nonconductive) of each solid state device is controlled by an electronic circuit of the logic transfer type connected in circuit relationship therewith such that the conduction of the solid state devices, and hence the illumination of associated lamps, is controlled in a desired sequence to thereby obtain the desired display on the sign. The logic transfer circuits associated with each particular row of lamps on a display panel section are serially connected to form a shift register circuit. Thus, in the case of a sign having characters displayed thereon of height equal to seven rows of lamps, seven shift register circuits comprise the logic transfer circuits associated with each display panel section. Each of the shift register circuits has a number of stages equal to the number of lamps in the associated row on that particular display panel section. Each display panel section is of sufficient width (in columns of lamps) to present one or more characters thereon, in many cases a single display panel section comprising the entire length of the sign.

The component which determines the message presented on the sign is, in general, contained within a control console located indoor and remote from the display panels. The remote control console includes an information circuit 24 which converts an information input into prescribed electrical logic signals $V_{li}$ of pulse form corresponding to a desired sequence of lamp illumination (the message displayed on the sign), an electronic clock circuit 25 which generates electrical pulses $+V_c$ at a substantially constant frequency wherein the frequency determines the speed of transmission of the logic through the logic transfer circuits and thus determines the speed of travel of characters across the sign, and may, if desired, further include a lamp intensity control circuit 26 which provides control (voltage $+V_p$) of lamp brightness on the sign from maximum brilliance to a dark condition in an infinite number of increments.

A second output of clock circuit 25 is connected to information circuit 24 to provide synchronization of the generated logic with the switching of the logic from one column of lamps to the next. An electronic circuit designated pulse generator and voltage switch 32 provides electrical signals $+V_S$, $+V_{pc}$ in response to the clock circuit pulses for switching the logic from column to column on the display sign, that is, from the logic transfer circuits associated with one column of lamps to the logic transfer circuits associated with the next successive column of lamps in accordance with the logic generated in information circuit 24. A power supply circuit 33 is supplied with alternating current electrical power through conductors 34 and provides electrical power to the various electronic components located on the display panel, the logic transfer circuits and circuits 32 and 33, in general, being located on such panel. The number of interconnecting electrical conductors between the remote control console and the display sign proper is, in general, equal to the number of rows of lamps on a display panel section (conductors 27), a conductor 28 for controlling speed of travel across the display sign, a common signal return conductor 40 and a conductor 29 to interconnect the sign with lamp intensity control circuit 26, if employed.

Figure 2:
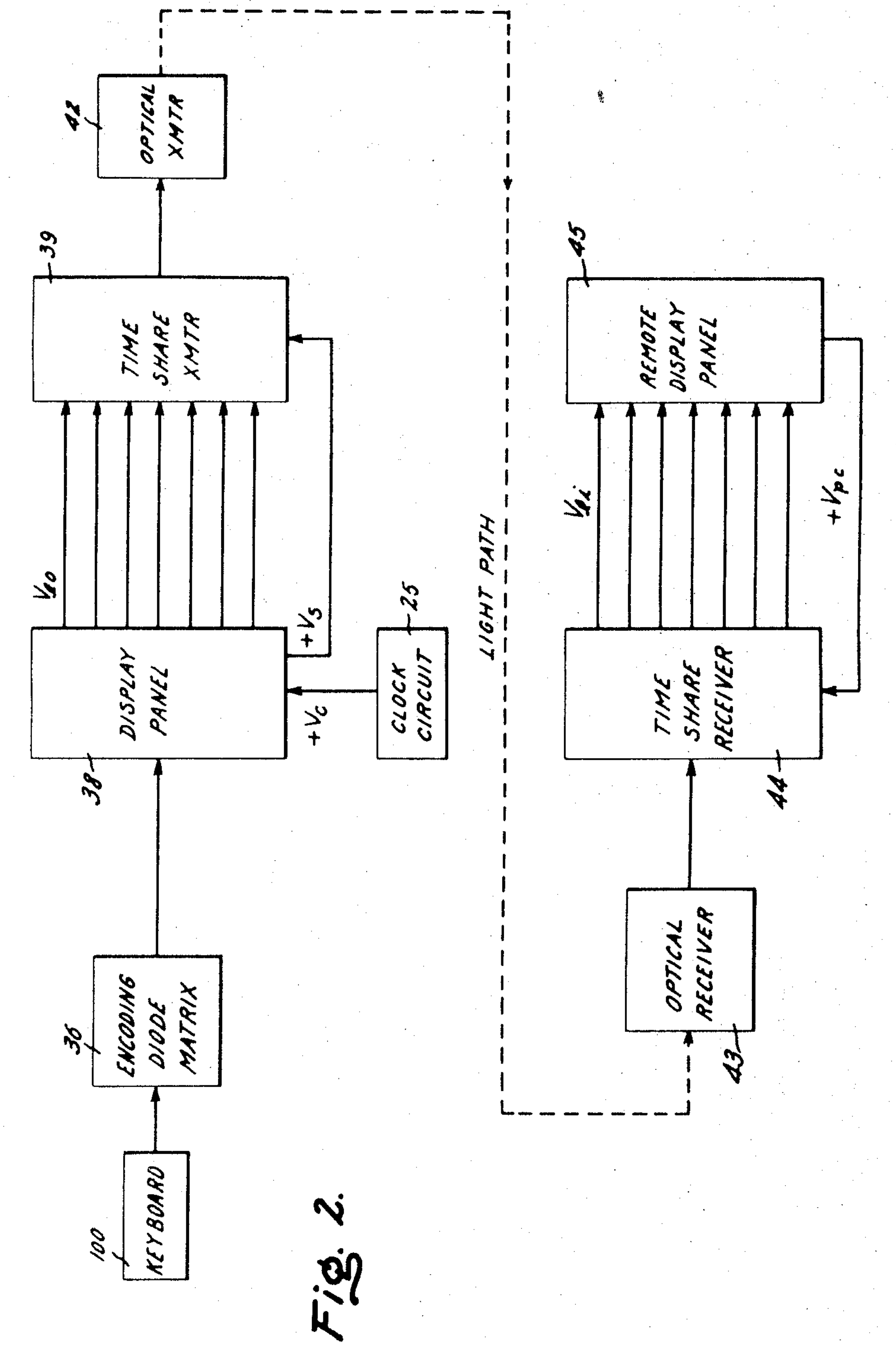

The two display panel sections 20, 21 illustrated in FIG. 1 may comprise sections of one sign, or each may comprise a complete sign, remote from the other, whereby the same message is presented at two remote locations. The number of electrical conductors interconnecting the sign proper with the remote control console also equals the number of conductors interconnecting two display signs located remotely from each other and adapted to display the same message thereon. However, it is often desirable to completely eliminate all of the electrical conductors which interconnect two remotely located signs displaying the same message. One arrangement for obtaining the necessary coupling between two remotely located signs without electrical conductors is a light emitting diode optical link system shown in block diagram form in FIG. 2, the details of the transmitter and receiver portions thereof illustrated in FIGS. 3*a* and 4*a*, respectively. The light emitting diode link is a multiplex data transmission system which permits transmission of information over considerable distances and will now be described with specific application to a connection between two remote display panels 38, 45 of a travelling message sign. Referring particularly to FIG. 2, there is shown a multiplex circuit used to time-share the light emitting diode optical link for seven channel operation. The seven channels are used to provide the logic connection between the seven rows of logic transfer circuits on each of the two remotely located display panels 38, 45.

The time-shared light emitting diode optical link system of FIG. 2 comprises an information circuit which may include a tape reader, a decoder-encoder, and readout display wherein the decoder-encoder decodes seven bit encoded characters on tape (in the particular case wherein the information input is encoded on tape and there are seven rows of information) to one of 53 unique outputs and converts the single unique decoder output to a selected combination of 42 outputs (in the case wherein seven rows by six columns of lamps determine one character) used by the readout display. The readout display is a buffer circuit for temporarily storing the information prior to its transfer and display on the sign. Alternatively, and in many cases, preferably, the information circuit comprises a direct entry circuit for generating the desired information logic without employing the intermediate decoder element. Examples of such direct entry circuits are illustrated in FIG. 6*b*, the manual keyboard entry device 100 being employed in FIG. 2. The output of direct entry circuit 100 is connected to an encoder 36 of conventional design (such as a diode matrix, resistor matrix, or magnetic core) having the parallel 42 outputs described above connected to a 42 bit character display on display panel 38. The resulting display on panel 38 is then shifted or stepped along the panel by a clock circuit 25, one column at a time, thus functioning as a travelling message sign. Transfer of the displayed information from display panel 38 to display panel 45 requires transfer of seven bits of information (one per row) for each column-by-column logic switching step. A single channel light emitting diode optical transmitter 42 is the communication connection between the two remote display panels. The optical transmitter is time shared for each of the seven bits of logic information transmitted in each column-by-column logic switching step. The time sharing function is provided by time-share transmitter 39 which is shown in greater detail in FIG. 3*a*.

Figure 3A:
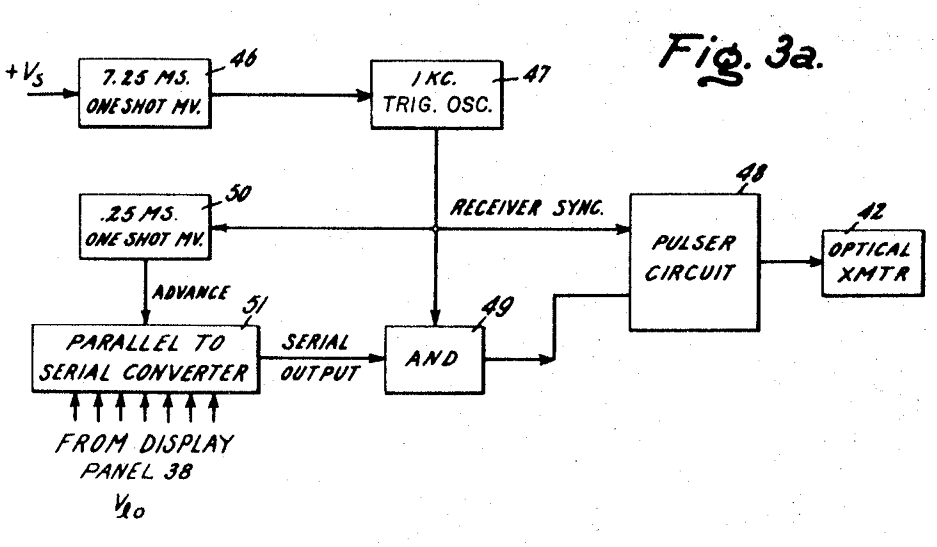

A block diagram of the time-share transmitter 39 illustrated in FIG. 2 is shown in FIG. 3*a*. The time-share transmitter converts the seven bit output $V_{lo}$ of display panel 38 to a form which can be transmitted over a single channel light emitting diode optical link. The maximum rate of information transfer is, in general, determined by the ability of the incandescent lamps on the sign to switch, that is, turn on and off, without producing the optical effect of excessive smearing as the message travels across the sign. This maximum rate of information transfer without excessive smearing is approximately 20 logic switches (cycles) per second. However, for some effects such as in a changing (non-travelling) message sign, and for fast clearing of the sign, that is, fast removal of the message, it is desirable to transfer information at the fastest rate available which is determined by the solid state device commutation limits determined by the power line frequency. This fastest commutation rate determined by power line frequency is normally 120 commutations per second (on a 60 cps power line). At this 120 cycle per second rate, the multiplex clock rate of clock circuit 25 for transferring logic from a seven column display is a minimum of 1,680 clock pulses per second (one synchronizing pulse and one information bit pulse per output). For convenience, a 2 kilocycle rate is selected for this particular application.

Figure 3B:
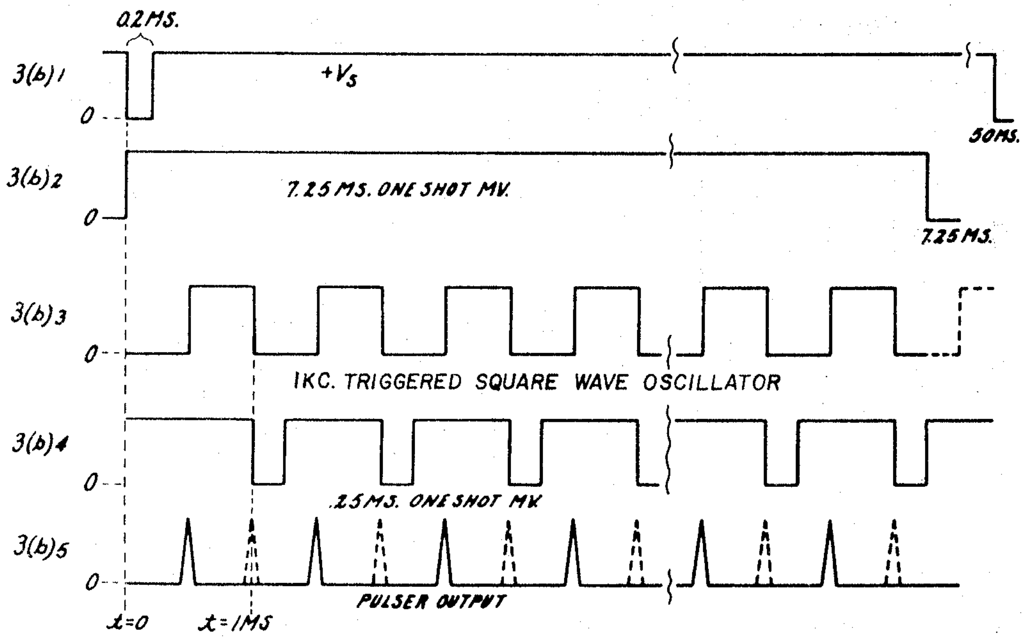

The time-share transmitter circuit 39 and data transmitter timing sequence associated therewith will now be explained with particular reference to FIGS. 3*a* and 3*b*, respectively. Assume for reference purposes that at time equal zero, common buss switched voltage $+V_S$ is switched to zero volts. The switching of voltage $+V_S$ is accomplished in the pulse generator and voltage switch circuit 32 on display panel 38 as described in the copending patent application. When this pulse $+V_S$ is received from display panel 38, a one shot multivibrator circuit 46 generates a pulse of 7.25 milliseconds (MS) duration as seen in FIG. 3(b)2. The 7.25 millisecond pulse initiates a 1 kilocycle per second triggered square wave generator circuit 47 which functions as a timing generator to generate pulses at a one kilocycle per second rate as illustrated in FIG. 3(b)3. The output of triggered square wave generator circuit 47 is applied to pulser circuit 48, a triggered pulse generator, for providing receiver synchronization, to a logic AND circuit 49, and to a one shot multivibrator 50 which provides a 0.25 millisecond time delay. The rising edge of the 0.25 millisecond pulse advances a seven stage parallel-to-serial converter circuit 51 one stage at a time to prepare it for readout of the next information bit stored therein and thereby convert the parallel seven-output $V_{lo}$ of the logic transfer circuits of display panel 38 to a serial form. The rising edge of the one kilocycle (1KC) square wave pulse triggers pulser circuit 48 for synchronizing the receiver to the transmitter, and the falling edge initiates the AND circuit 49 and multivibrator 50.

The timing sequence of the 0.25 millisecond delay pulse is illustrated in FIG. 3(b)4 as being initiated at the fall time of the one kilocycle square wave pulse. The second input to parallel-to-serial converter circuit 51, the parallel seven bit input $V_{lo}$ is applied during the time interval of the pulse $+V_S$. Thus, the output of time-share transmitter 39 consists of seven synchronizing pulses equally spaced, and up to seven information (logic) bit pulses, each pulse separated by 0.5 milliseconds as illustrated in FIG. 3(b)5 wherein the logic bit pulses are designated by dash line form. The output of pulser circuit 48 is thus seen to be operable at the two kilocycle per second rate hereinabove selected, and is connected to the anode of a light emitting diode in the optical transmitter circuit 42 which also includes a suitable lens for focusing the output of the diode.

The receiver portion of the time-shared light emitting diode optical link is illustrated generally in FIG. 2 as comprising an optical receiver circuit 43, a time-share receiver 44 and a display panel 45 which are all located remote from the transmitter portion of the system. Optical receiver circuit 43 includes a photodetector which may be of the photoelectric cell type and a suitable lens for focusing the light emitted by the optical transmitter 42 upon the photodetector.

Figure 4A:
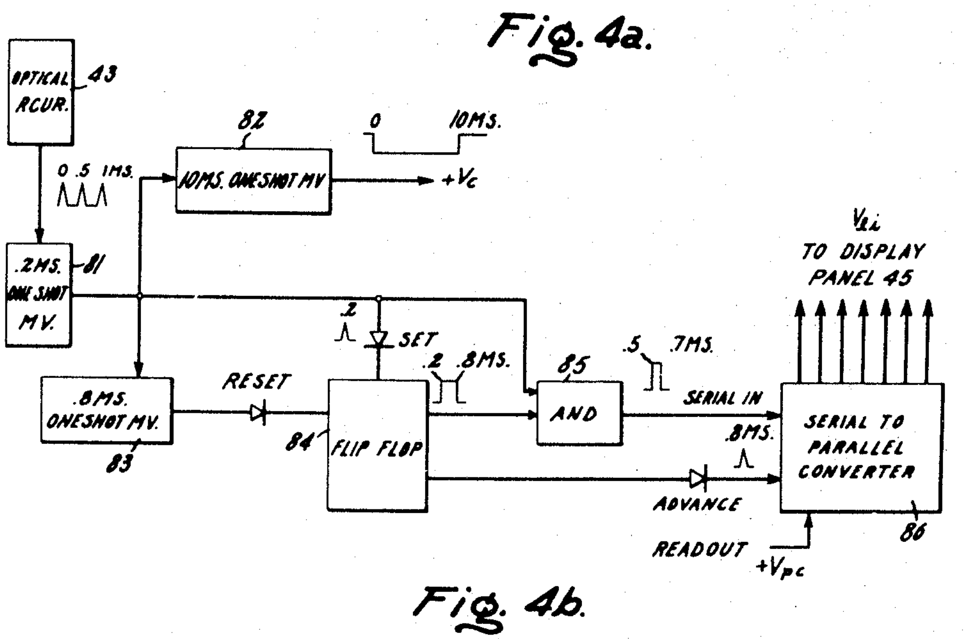
FIG. 4 is a block diagram of the receiver section of the light emitting diode optical link and FIG. 4*b* illustrates the timing sequence of electrical signals at various points in the receiver.
Figure 4B:
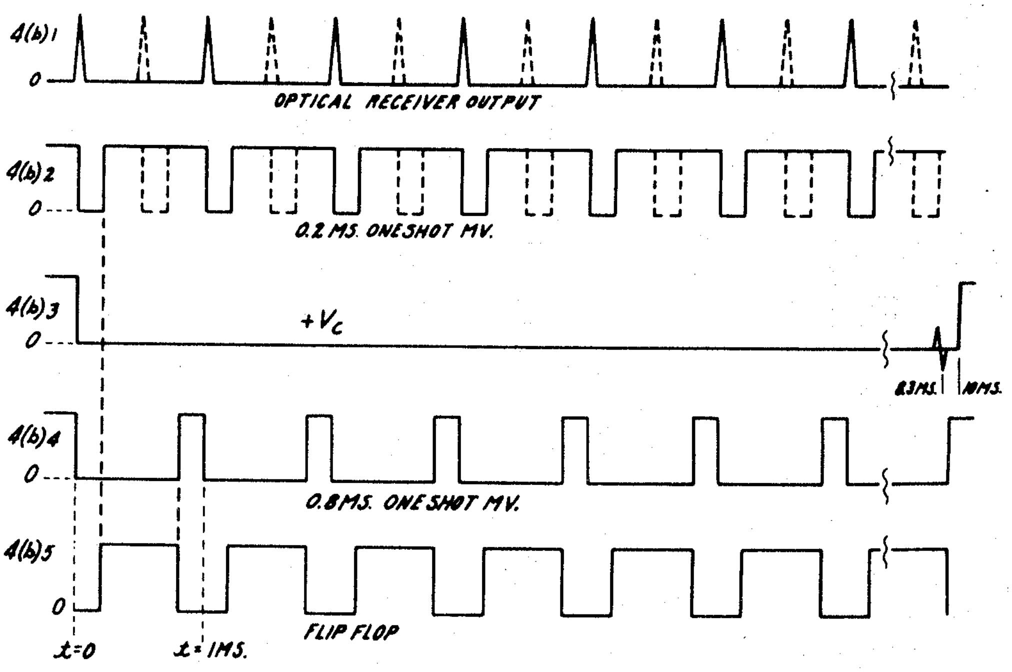

Details of the time-share receiver and data receiver timing sequence associated therewith are shown in FIGS. 4*a* and 4*b*, respectively. The output of optical receiver 43 is amplified and shaped by a 0.2 millisecond one shot multivibrator circuit 81 which also includes a preamplifier stage. The input to the 0.2 millisecond one shot multivibrator 81 is illustrated in FIG. 4(b)1 and the stretched output signal of the multivibrator circuit 81 is shown in FIG. 4(b)2 wherein the synchronizing pulses are designated by solid line and the information bit pulses by dash lines corresponding to the pulser 48 output in FIG. 3(b)5. The stretched output signal of the 0.2 millisecond one shot multivibrator initiates a ten millisecond one shot multivibrator 82 which generates the clock pulse $+V_c$ to advance the logic on the remote display panel 45 by one column at the next 60 cycle zero crossing. The synchronizing pulses (solid line pulses in FIGS. 4(b)1 and 4(b)2 are time separated from the information (logic) bits by a 0.8 millisecond one shot multivibrator circuit 83 and a bistable flip-flop circuit 84 in the following manner. Flip-flop circuit 84 is "set" by the rising edge of the 0.2 millisecond synchronizing pulse generated by one shot multivibrator 81, and is "reset" by the rising edge of the 0.8 millisecond pulse generated by multivibrator 83. The setting and resetting of flip-flop circuit 84 at the 0.2 and 0.8 millisecond times, respectively, is provided as a first input to a logic AND circuit 85. A second input to the AND circuit includes the output of the 0.2 millisecond one shot multivibrator 81 which includes both synchronizing and information bit pulses. Reference to FIGS. 4(b)2 and 4(b)5 indicates that the only output that may be obtained from AND circuit 85 is the information bit pulse which, if it is present, exists between the 0.2 and 0.8 millisecond edges of the flip-flop 84 output. Thus, the output of AND circuit 85 represents only logic information bits in serial form which upon serial-to-parallel conversion, command the associated logic transfer circuits of the remote display panel 45 and thereby control illumination of corresponding lamps. A second output of flip-flop circuit 84 represents the synchronizing pulses which serially advance the logic in a seven stage serial-to-parallel convertor 86 one stage at a time. Serial-to-parallel converter 86 is read out when the logic for each column of lamps has been stored within the converter, the voltage pulse $+V_{pc}$ initiating such readout of the converter and subsequent transfer to the parallel seven-input $V_{li}$ at the logic transfer circuits of remote display panel 45. It should be noted that the first synchronizing pulse occurs 0.5 milliseconds after the reference time equal zero of FIG. 3b, and each 60 cycle zero crossing occurs at approximately 8.3 milliseconds. Thus, the zero crossing, which determines the column-by-column logic transfer times, occurs at a time after the generation of all seven synchronizing and information bit pulses but well within the 10 millisecond duration of the $+V_c$ pulse of FIG. 4(b)3.

A good optical alignment between optical transmitter 42 and optical receiver 43 is obviously necessary for obtaining operation of the hereinabove described data transmitting system. In a particular application, at a distance of 200 feet between the optical transmitter and receiver, the signal level of the photodetector in optical receiver 43 exceeded 1 volt whereas the optical receiver input sensitivity was less than 10 millivolts. Thus, the system can be operated at distances much greater than 200 feet. The long life, semiconductor impedance compatability, and wide bandwidth are some of the significant advantages of the light emitting diode optical transmitter. In the particular application of the seven channel travelling message sign hereinabove described, the wide bandwidth capabilities of the light emitting diode was such that the diode was in an "on" or active state less than 2 percent of time, thus the system has a capability for greatly increased information handling. Each of the components of the data transmission system hereinabove described is of conventional design and thus the details of the block diagram are not illustrated. The aforementioned system may also be used with other more conventional single channel links such as radio frequency or wire pair rather than the light emitting diode optical channel described.

Referring now to FIG. 5, there is shown a circuit diagram for obtaining the optical effects of circulation of a message, inversion of characters comprising a message, and a disappearance or tunneling of a message at a first point along the sign and the reappearance of the message at a point further along the sign. In particular, there are shown two of the display panel sections 21, 20 as illustrated in FIG. 1 and the seven electrical conductors interconnecting these two display panel sections. The circuit component for obtaining the optical effect of circulating a particular message along a particular portion of the sign is a switching circuit 88 which as a nonactuated "normal" (N) position, and an actuated "circulate" (C) position. In the normal N position, the logic output $V_{lo}$ of display panel section 21 is undisturbed and the message continues on through the remainder of the sign. In the circulate C position of the switch, the seven channel logic connection between adjacent display panel sections 21 and 20 is disconnected and the logic input $V_{li}$ of display panel section 20 is connected to the output of display panel section 20 which represents the end point of the circulation loop. It is to be understood that display panel section 21 in FIG. 5 is not necessarily the first panel in the sign as shown in FIG. 1. Further, display panel section 20 in FIG. 5 represents any desired number of display panel sections which comprise the message circulation loop, the circulation loop display panel sections being located further along the sign from panel section 21. Any number of switching circuits 88 may be provided along the length of the sign to obtain recirculation of one or more messages, simultaneously, if desired. Switching circuit 88 as well as the other switching circuits shown in FIGS. 5, 7, 8, 9*a*, 10, 11*a* may include switches of the electronic or mechanical type, switches of the mechanical contact, relay-actuated type being illustrated for convenience only. The seven movable arms of switch 88 are actuated simultaneously in response to a signal generated in a "circulate command" control circuit 89 which is supplied with an appropriate signal to command operation of switch 88. Control circuit 89 is of conventional design and may conveniently be located at the remote control console.

The actuation of the circulation switching circuit 88 causes a recirculation of any message or characters contained within the circulation loop at the time of the switching. In many applications, it is desirable to circulate a particular message not included within the circulation loop at that instant of time, and to obtain this particular feature a second switching circuit 92 is employed to provide an optional input to the circulation loop. As illustrated in FIG. 5, switching circuit 92 has a nonactuated "normal" (N) position and an actuated "optional input" (O) position. In the normal N position, the logic output $V_{lo}$ of display panel section 21 is undisturbed and the normal message continues on through the remainder of the sign. In the optional input O position of the switch, the seven channel logic connection between display panel sections 21 and 20 is disconnected and the logic input $V_{li}$ of display panel section 20 is connected to an optional logic input, the logic input $V_{li}$ source. The seven movable arms of switch 92 are actuated simultaneously in response to a signal generated in an "optional input command" control circuit 93 which is of conventional design and may also conveniently be located at the remote control console. The optional input control is generally employed in conjunction with the circulate control 89 to permit introduction of a desired message within the circulation loop on the sign. The optional input control may be initiated at a time when no characters or portion of a message are located within the circulation loop, or, alternatively, the first part of the optional input message may comprise suitable blanking information bits to cause erasure of the previous characters contained within the circulation loop. The sequence of operation of the circulate control when employed with the optional input control is to first actuate the optional input, and upon having the desired message within the circulation loop, the circulate control is thence actuated and the optional input simultaneously inactivated to complete the circulate loop.

In the circulate mode of operation, it may be desirable to tunnel the message not being circulated around the portion of the sign containing the circulating message, and to have the noncirculating message reappear at that point along the sign just subsequent to the circulation loop, that is, to have the noncirculating message disappear and reappear at a subsequent position along the sign. To accomplish this purpose, a third switching circuit 94 is located at the portion of the sign wherein the message is to reappear. This tunnel control switching circuit also comprises a plurality of two position switches, each switch having an nonactuated "normal" (N) position and an actuated "tunnel" (T) position. In the normal N position, the logic output $V_{lo}$ or display panel section 20 is undisturbed and the normal message passing through display panel sections 21, 20 continues on through the remainder of the sign. In the tunnel T position of the switch, the logic input $V_{li}$ to display panel section 19 is disconnected from the logic output $V_{lo}$ of display panel section 20 and connected to the logic output $V_{lo}$ of display panel section 21 which represents a point on the sign somewhere prior to the immediately preceding display section. The seven movable arms of switch 94 are actuated simultaneously in response to a signal generated in a "tunnel command" control circuit 95 which is of conventional design and may also conveniently be located at the remote control console. The tunnel control may be initiated simultaneously with the circulate control and optional input control, if desired, to produce the simultaneous circulation of an optional message within the circulation loop and to have the normal sign message tunnel under such circulation loop and reappear on the sign at a point subsequent to the circulation loop.

A fourth switching circuit 90 also located in the interconnecting conductors between display panel sections 21 and 20 obtains the optical effect of inversion of the characters comprising the message on the display sign. Switching circuit 90 is also a two position switch, having a nonactuated "normal" (N) position and an actuated "inversion" (I) position. In the normal N position, characters that comprise the message are not modified and the message continues on through the sign undisturbed. In the inversion I position of the switch, the conductors from the output of display panel section 21 are disconnected and reconnected to the input to display panel section 20 in an inverse relationship. The six movable arms of switch 90 are actuated simultaneously in response to signal generated in an "inversion command" control circuit 91 which is of conventional design and may also be located at the remote control console. A second inversion switching circuit may be located further along the sign to reinvert the characters into their original condition, if desired.

FIG. 6*a* illustrates an input information circuit which may be used as a direct entry into the sign without employing a decoder as in the case of the information circuit 24 of FIG. 1 and described in the U.S. Pat. No. 3,384,888. The direct entry input information circuit of FIG. *6a* comprises a stepping switch 96, as a particular method, which is connected at one terminal end to a source of voltage +V. The movable arm of switch 96 automatically moves sequentially across the contacts to generate the logic that comprises the message to be displayed. The logic-making contacts indicate the message to be composed and are connected to the associated encoder character within encoder 97 to generate the particular logic corresponding to the letters of "GOOD MORNING" in this particular illustration. Encoder 97 may comprise the encoding diode matrix 36 illustrated in FIG. 2 or other known encoders such as a resistor matrix or magnetic core, and has as an input a number of electrical conductors equal to the different characters in the message to be displayed. The output of encoder 97 comprises a number of electrical conductors equal to the number of logic transfer circuits that are employed in generating each character. Thus, in the particular application wherein one letter is comprised of lamps arranged in seven rows and six columns, 42 conductors comprise the output of encoder 97, and these are connected to the respective logic transfer circuits contained within a readout display that functions as a buffer circuit 98. Buffer circuit 98 is employed for temporary storage of one character prior to its transfer to the sign as is more fully described in the U.S. Pat. No. 3,384,488. The output of buffer circuit 98 is the logic input $V_{ti}$ which may be provided as an input to the first display panel section of the sign or as the optional input in FIG. 5.

The advantage of the direct entry information input circuit illustrated in FIG. *6a* is that it avoids the need for a decoder as employed in the copending patent application and thus a more simplified information circuit 24 is obtained. FIG. *6b* illustrates the extension of the direct entry concept in a circuit which provides for the selection of any one of three direct entry information input circuits. A first of the three direct entry circuits designated message maker 99 is the stepping switch 96 illustrated in FIG. *6a*. The output of message maker 99 comprises the number of electrical conductors required for connection to an encoder, the number of conductors being equal to the different characters included within the message which is automatically generated by stepping switch 96.

The second direct entry information input circuit is a manual keyboard 100 wherein the particular characters comprising the message are punched out on a typewriter device rather than being automatically preset as in the stepping switch 96. The typewriter keys of keyboard 100 are connected to a switching circuit having an output similar to the output of the stepping switch of message maker 99. A third and automatic direct entry information input circuit is the time-temperature circuit 101. In this third direct entry circuit, the information provided to the encoder 97 is correct time and temperature which is typically provided on signs installed on banks and other buildings. The correct time information is provided by a continuously running clock with an output in suitable form compatable with the system shown in FIG. *6b*, and the temperature information is provided by a thermometer and suitable thermal transducer. The output of the third circuit 101 thus comprises 10 conductors associated with the 10 number characters, and may also include two additional conductors for designating temperatures above and below 0° Fahrenheit.

The GOOD MORNING message generated by the stepping switch 96 in FIG. *6a* is also illustrated as being generated by message maker 99 in FIG. *6b*. The manual keyboard 100 is also illustrated as adapted to form the GOOD MORNING message as well as to provide an output consisting of numbers which are the same as the logic output generated by the time-temperature circuit 101. Switch 102 thus permits the choice of an automatic direct entry information input as provided by message maker 99 or the time-temperature circuit 101, or provides a manual direct entry information input provided by keyboard 100. The outputs of the three direct entry information input circuits 99, 100, 101 are connected to the input an encoder such as illustrated in FIG. *6a*, the output of the encoder being connected to a buffer circuit which at its output provides the logic signals $V_{ti}$ which may be provided at the first input to the sign or as the optional input in FIG. 5.

The conventional method of writing on a sign, that is, forming the characters of a message on the sign, is to employ illuminated lamps for the character on an nonilluminated lamp background. It may be desired, in some instances, to obtain the optical effect of negative writing on the sign wherein the characters displayed comprise nonilluminated lamps on an illuminated lamp background. The negative writing optical effect is obtained by inserting a switching circuit 104 in the electrical conductors interconnecting the logic transfer circuits of two adjacent display panel sections, 21, 20 as illustrated in FIG. 7. Switching circuit 104 includes a two position switch and a simple transistor circuit in each of the seven logic channels for inverting the logic being transmitted from display panel section 21 to display panel section 20. The two position switch has a nonactuated "positive writing" (P) position and an actuated "negative writing" (N) position. In the actuated P position, the logic output $V_{to}$ of display panel section 21 is undistrubed and thus the positive writing comprising illuminated lamps on a nonilluminated lamp background is maintained. In the actuated N position of the switch, the logic is inverted and a negative writing optical effect is obtained. The seven movable arms of the switch are actuated simultaneously in response to a signal generated in a "negative writing command" control circuit 105 which may conveniently be located at the remote control console. It is apparent from FIG. 7 that, when the logic in each of the seven channels is inverted and the characters presented on the sign are seven rows high, there is no border effect on the sign to set off the negative written characters. In some applications, it may be desirable to maintain a border of one row of illuminated lamps at the top and bottom of the sign to more distinctly set off the characters in their negative written state. To accomplish this latter optical effect, either the characters presented on the sign must be programmed at the information input from seven to five rows or channels in height, and the information input must also be programmed to call for the appropriate logic to obtain illuminated lamps in the outer two rows, or a nine row (two border rows) format might be used.

The conventional motion of the characters on the sign in a travelling message mode of operation is from the right end of the sign toward the left end, as viewed by an observer, and this is defined as motion in the forward direction. It may be desired, in some instances, to reverse the direction of motion of the characters, that is, to cause the characters to move in a direction from the left end of the sign toward the right end. The circuit of FIG. 8 obtains this motion in a reverse direction. FIG. 8 of the present application is FIG. 5 of the U.S. Pat. No. 3,384,888 modified to obtain reverse motion on the sign of the characters comprising a travelling message. For purposes of review the circuit illustrated in FIG. 5 of the U.S. Pat. No. 3,384,888 will now be briefly described with reference to the optical effect of character movement in the forward direction on the sign, that is, the transfer of logic in this forward direction. FIG. 8 illustrates a schematic diagram of the component designated as pulse generator and voltage switch circuit 32 and three stages of one row of the logic transfer circuits 37, separated from component 32 by means of dashed line 53. Pulse generator and voltage switch 32 is comprised of transistor 54 connected in an AND logic circuit, and transistor 55 connected in a circuit for obtaining a voltage $+V_S$ switching function. A third circuit including transistor 56 provides a pulse $+V_{pc}$ generating function. The input voltages to pulse generator and voltage switch 32 include two full wave rectified, filtered voltages $-V_h$, $+V_h$, and a full wave rectified, unfiltered voltage $+V_b$ supplied from the power supply circuit 33 in FIG. 1, and the clock pulser $+V_c$ generated by clock circuit 25. The clock circuit output voltage $+V_c$ is a DC voltage which periodically switches to zero for the time interval of one of the clock pulses. A switched voltage common buss 57 is connected to the collector electrode of transistor 55, and the presence or absence of switched voltage $+V_s$ on buss 57 is determined by the mode of operation of transistor 55 wherein such transistor switches voltage $+V_h$ to buss 57 when in its conductive state. During the time interval in which clock pulse $+V_c$ is applied to terminal 61, transistors 54 and 55 are in fully conductive states and switched voltage $+V_s$ is present on switched voltage common buss 57. Switched voltage $+V_s$ remains on buss 57 until such time that voltages $+V_b$ and $+V_c$ are concurrently at, or near, zero at which time the voltage $+V_s$ on buss 57 switches to zero and remains at zero during the time when voltage $+V_b$ is near zero crossing. At such zero crossing, the power system zero crossing time, transistors 54 and 55 are in a nonconductive state. The three stages of logic transfer circuits 37 include lamps 64, 65 and 66 (successive lamps in one row) each connected to circuit relationship with a corresponding solid state controlled conducting device 67, 68 and 69, respectively. The solid state devices 67, 68, 69 (illustrated as gate turn-on silicon controlled rectifiers) are employed to carry both the logic and lamp power for the associated lamps. Thus, during the conduction interval of solid state device 68, a DC current flows from lamp common buss 70 being supplied at terminal 63 with voltage $+V_L$, through lamp 65, blocking diode 71, and solid state device 68 to a common ground or signal return conductor 40 connected to terminal 62 maintained at zero volts. Lamp voltage $+V_L$ is full wave rectified, unfiltered, phase controlled voltage supplied from the power supply circuit 33.

The operation of the logic transfer circuits 37 for the case wherein the logic commands that the nonilluminated state of a particular lamp be transferred in a forward direction to the next subsequent lamp in this same row of lamps is as follows: Assume that solid state device 68 is nonconductive whereby associated lamp 65 is nonilluminated and such logic is to be transferred to the logic transfer circuit which includes lamp 66 and solid state device 69. At steady state conditions, the anode of solid state device 68 is at the switched voltage $+V_S$, no clock pulse is supplied to terminal 61, and capacitor 74 becomes charged through resistors 73, 75 and 77 to the voltage $V_S$ which is approximately 20 volts as one example. Now, assume that a clock pulse $+V_c$ is supplied to terminal 61 for approximately 8 milliseconds, a time interval of sufficient duration to insure that only one zero crossing of voltage $+V_b$ occurs during the clock pulse interval. The concurrent presence of the clock pulse and zero crossing of voltage $+V_b$ renders transistors 54 and 55 nonconductive thereby switching voltage $+V_S$ on switched voltage common buss 57 to zero, and during this short interval of time which may be in the order of 100 microseconds (the total time for transferring logic), all of the solid state devices 67, 68, 69 in the logic transfer circuits are fully commutated off. The subsequent rise of voltage $+V_b$ in a positive direction after falling to zero causes transistors 54 and 55 to become conductive thereby reapplying voltage $+V_S$ to the switched voltage common buss 57. At this time, all of the solid state devices 67, 68, 69 are in a nonconducting state and transistor 56 is momentarily rendered conductive through capacitor 78. The momentary conduction of transistor 56 generates a voltage pulse $+V_{pc}$ on pulse common buss 79, capacitor 74 maintains its charge during the short duration of pulse $+V_{pc}$, and diode 76 remains reverse biased since the voltage magnitude of pulse $V_{pc}$ is less than $V_S$ and thus no gate current is supplied to solid state device 69 and it therefore remains nonconductive. Thus, the logic has been transferred from the circuit including lamp 65 and solid state device 68 to the circuit including lamp 66 and solid state device 69 during the time interval of pulse $+V_{pc}$.

The operation of the logic transfer circuit in the case wherein the illuminated state of a lamp is transferred to the next subsequent lamp in the same row in a forward direction is as follows: Assume that solid state device 68 is conducting and associated lamp 65 is therefore supplied with electrical power and is in an illuminated condition. At this time, the anode of device 68 is at a voltage of approximately 1 volt, the voltage drop across device 68. Under these conditions, capacitor 74 is charged to the voltage at the anode of device 68, that is, to approximately 1 volt. The sequence of operation of the pulse generator and voltage switch circuit 32 and the logic transfer circuits 37 is the same as in the nonilluminated logic transfer case hereinabove described through the step wherein transistor 56 momentarily becomes conducting and generates voltage pulse $+V_{pc}$ on pulse common buss 79. At this time, diode 76 becomes conductive since the voltage magnitude of pulse $V_{pc}$ is approximately 10 volts as compared to the one voltage charge on capacitor 74. The conduction of diode 76 causes a current flow through capacitor 74 to the gate of solid state device 69 thereby causing such device to become conductive. Thus, it can be seen that the logic has been transferred from the circuit including lamp 65 and device 68 to the circuit including lamp 66 and device 69. It thus follows that capacitor 74 is charged in its steady state condition (the interval between logic transfer) to a voltage of approximately 1 volt if the previous stage is "on" (lamp illuminated), and is charged to switched voltage $V_S$ of approximately 20 volts if the previous stage is "off" (lamp not illuminated).

In order to obtain reverse motion of the travelling message on the sign, the addition of a capacitor-resistor-diode circuit (74R, 75R, 76R) in each of the stages of logic transfer circuitry is employed as illustrated in FIG. 8. The additional circuitry corresponds to the elements capacitor 74, resistor 75 and diode 76 employed in the forward motion of logic transfer (character travel). Thus, resistor 75R is connected from the anode of solid state device 69 to the juncture of capacitor 74R and the cathode of diode 76R. The other end of capacitor 74R is connected to the gate electrode of solid state device 68, and the anode of diode 76R is connected to pulse common buss 107. The three reverse motion elements resistor 75R, capacitor 74R and diode 76R interconnect one stage of logic transfer circuitry to the immediately preceding stage whereas the forward motion elements interconnect one stage to the immediately succeeding stage. The three reverse motion elements provide the same circuit function as corresponding forward motion elements resistor 75, capacitor 74, diode 76 and the circuit operation for reverse motion of the characters on the sign will thus not be described. A switching circuit 108 connected in the collector electorde circuit of transistor 56 determines the direction of motion of the travelling message on the sign. Switching circuit 108 is actuated in response to a signal generated in a "motion direction command" control circuit 109 which is of conventional design and may conveniently be located at the remote control console. Switching circuit 108 has a nonactuated "forward motion" (F) position and an actuated "reverse motion " (R) position. In the forward F position, the momentary conduction of transistor 56 generates voltage pulse $+V_{pcF}$ on pulse common buss 79. In the reverse (R) position of the switch, the momentary conduction of transistor 56 generates a voltage pulse $+V_{pcR}$ on pulse common buss 107. Operation of switching circuit 108 thus permits control of motion of a travelling message on the display sign in both directions of travel.

The lamps 64, 65, 66 used on the display sign in FIG. 8 are preferably of a type having the shortest possible extinguishment time in order to minimize the tailing effects produced in travelling message displays. As an example, the lamps employed in the General Electric World's Fair Progressland Pavilion are 6 watt, 13.5 volt gas-filled incandescent lamps. As described in the U.S. Pat. No. 3,384,888, the speed of travel of the message across the sign may be varied and, at the higher speeds of travel, tailing effects may be observed due to the noninstantaneous extinguishment of the lamps. This tailing effect, being undesirable since it causes a smearing of the characters, may be decreased by employing a time delay circuit 110 in the collector electrode circuit of transistor 56 in the pule generator and voltage switch circuit 32. Time delay circuit 110 is inserted into the circuit by operation of switch 111 which may be activated from a command control circuit (not shown) located at the remote control console. Time delay circuit 110 is of conventional design and provides a time delay in the order of 10 to 20 milliseconds between the time at which transistor 56 is momentarily rendered conductive by the reapplication of voltage $+V_S$ to switch voltage common buss 57 and the subsequent time of generation of voltage pulse $+V_{pc}$. The delay in the generation of voltage pulse $+V_{pc}$ thus delays the application of this logic transferring signal to the logic transfer circuits 37 until some time after all of the solid state devices 67, 68, 69 have been commutated off. This delay in logic transfer thereby provides a time delay between the time at which lamps in one column are in the process of being extinguished (the period in which the solid state devices 67, 68, 69 are commutated off) and the time at which lamps in the next adjacent column are illuminated (upon transfer of logic to such next successive logic transfer circuits). A second arrangement (not shown) for decreasing tailing effects produced by the slow extinguishment of lamps in a travelling message display employs a gated time delay circuit in the emitter circuit of the unijunction transistor of FIG. 8 in the U.S. Pat. No. 3,384,888 wherein such FIG. 8 circuit is the component designated lamp intensity control circuit 26 in FIG. 1. In such second embodiment, clock circuit output $+V_C$ is employed for gating on the time delay and thereby inhibiting operation of the lamp intensity control circuit 26 for the prescribed time delay until the lamps in the previous column have been substantially extinguished.

FIG. 9*a* illustrates a circuit for obtaining the optical effect of stopping or "freezing" a selected travelling message along a particular portion (modules 8–19) of the sign while the remainder of the sign and any message thereon continues operating (moving) in a normal manner. The circuit for the "freeze" control is an auxiliary circuit, similar in construction to the pulse generator and voltage switch circuit 32 and logic transfer circuits 37 of FIG. 8 and used in conjunction therewith. The "freeze" control circuit inhibits the clock pulses $+V_C$ applied to pulse generator and voltage switch circuit 32 to thereby inhibit logic transfer, one module at a time. Each module is defined as a display panel section of width sufficient to display one seven row by six column character thereon, this type of modular construction being employed in the 1964–65 New York World's Fair General Electric Progressland Pavilion sign. In FIG. 9*a*, the "freeze" control circuit is illustrated as supplying the clock pulses $+V_C$ to the $+V_C$ terminal 61 of pulse generator and voltage switch circuits 32 associated with module numbers 8 through 19, these particular modules being chosen as the "freeze" control portion of the sign. For purposes of explanation, the portion of the "freeze" control circuit corresponding to the pulse generator and voltage switch circuit 32 is designated circuit 32*a* herein, and the portion corresponding to the logic transfer circuits 37 is designated circuit 37*a*. Circuit 32*a* of the freeze control circuit in FIG. 9*a* includes the pulse generator and voltage switch circuitry of FIG. 8 and a frequency dividing circuit 113 in the base electrode circuit of transistor 54 for dividing the frequency of the incoming clock pulses $+V_C$ by six, six being the number of columns of lamps (and logic transfer circuits 37) per module. Frequency divider circuit 113 is an electronic bistable circuit which may comprise conventional flip-flop circuits. Circuit 37*a* of FIG. 9*a* includes the forward motion logic transfer circuitry of FIG. 8, but, in place of each of the lamps 64, 65, 66, a two-input gate circuits is employed. Each two-input gate circuit comprises a pair of diodes 114, 115 having a common connection at their cathodes. The anode of a first of the pair of diodes 114 is connected to the input clock pulse $+V_C$ buss 28, and the anode of the second diode 115 is connected to the anode of the solid state device (67, 68 or 69) connected in circuit relationship therewith. The juncture of the cathodes of each pair of diodes is connected to an electrical conductor 118 which is connected to the clock pulse $+V_C$ input terminal 61 of the pulse generator and voltage switch circuit 32 associated with each module (8–19) as shown in FIG. 9b. The auxiliary circuit of FIG. 9*a* is thus an intermediate circuit for sequentially inhibiting the clock circuit pulses $+V_C$ which are generated by clock circuit 25 at the remote control console to thereby obtain the "freeze" control. A two position switch 119, which is connected at the point in the circuit 37*a* corresponding to the logic input $V_{li}$ point of the logic transfer circuits 37 in FIG. 8, is the device for initiating operation of the "freeze" control circuit. Switch 119 may be actuated in response to a signal generated in a suitable command control circuit conveniently located at the remote control console. The "freeze" control operates in the following manner: In the nonactuated "normal" (N) position of switch 119, the gate circuit of solid state device 67 is grounded, and this zero voltage condition causes all of the solid state devices 67, 68, 69 to be in a conducting state. Under such conditions, the clock pulses $+V_C$ generated by clock circuit 25 are transmitted directly to the clock pulse terminal 61 of each module by way of conductor 28, diode 114 of each two input gate circuit, and conductor 118. In the actuated "freeze" (F) position of switch 119, the input to the gate circuit of solid state device 67 is connected to the switched voltage $+V_S$ common buss 57. At the moment that switch 119 is operated into the freeze F position, all of the solid state device 67, 68, 69 are also in a conducting condition, but the next clock pulse $+V_C$ which is divided in frequency by six by circuit 113 causes nonconduction of solid state device 67 and thus forward biases diode 114 of the two-input gate circuit associated with solid state device 67. The forward bias (conduction) of diode 114 supplies a DC level to the $+V_C$ terminal 61 of module 8 and prevents the pulse generator and voltage switch circuit 32 thereof from transferring any further logic through such module, that is, it freezes the logic state of module 8, regardless of any new logic inputs at the logic input terminal $V_{li}$ in module 8.

The information input to information circuit 24 at the remote control console must, of course, be correctly programmed to actuate switch 119 at the desired time when the presecribed character has moved along the sign and reached the particular "freeze" module. Thus, it must be known which particular modules in the sign are connected in the "freezing" mode of operation. For illustrative purposes only, it will be assumed that a sign in FIG. 9*b* consists of 21 modules and that modules 8 through 19 can be connected in the "freezing" mode of operation. Module 1 represents the extreme left end of the sign as viewed by an observer and module 21 the extreme right end, it being understood that the logic from the information circuit 24 enters the logic transfer circuits at module 21. The information input is so programmed that upon the first character (G) of a selected travelling message (GOOD MORNING) reacing the module (8) at which it is to be frozen, a command signal initiates operation of switch 119, disconnects it from the normal N position and reconnects it to the freeze F position. At this point in time, and during the interval of the next six clock pulses, the first character (G) of the message becomes stationary in module 8, that is, becomes frqozen as illustrated in FIG. 9(b)1. During the next six clock pulses, the remaining characters on the sign each advance one module as shown in FIG. 9(b)2, and the first letter O becomes frozen in module 9 since solid state device 68 becomes nonconductive at this time. In like manner, the second letter O becomes frozen in module 10 during the interval of the next six clock pulses as illustrated in FIG. 9(b)3. It is readily apparent that the message to be frozen as programmed in the information input must be in double spaced form, as illustrated in FIG. 9(b)1, since during the interval that one character is being frozen, the remaining unfrozen characters continue to move along the sign in normal operation. Thus, every other character is eliminated in the "freeze" procedure wherein the clock pulses are divided by six as illustrated in FIG. 9a. In the more general application, the characters eliminated will be proportional to the division factor selected in component 113. Thus, if a divide-by-12 factor is used, two characters following each frozen character are eliminated. The eliminated characters are defined as the spaces on the sign which are between the characters that will be retained in the frozen state. These eliminated characters can be vacant spaces or any characters such as the XYZ illustrated in FIG. 9(b)1 through 9(b)3. Therefore, a message can be disguised or modified by employing this procedure.

In the opration of the freeze control, for each divided-by-six frequency clock pulse which operates circuit 32a of FIG. 9*a*, six normal frequency clock pulses are supplied to the remaining unfrozen modules to cause normal logic transfer and thus normal travel of the characters along the sign. The successive groups of six clock pulses $+V_C$ thus finally freeze the complete GOOD MORNING message in modules 8 through 19 as shown in FIG. 9(b)4. At a desired subsequent time, a suitable command signal provided in the information input operates switch 119 into its normal N position and causes the frozen message to unfreeze. The unfreezing process causes modules 8 through 19 to be successively unfrozen in a manner similar to the freezing process. Thus, module 8 is first unfrozen during the first six clock pulses and causes the first letter G to be advanced to module 7, the remaining modules 9–19 remaining frozen as illustrated in FIG. 9(b)5. The second six clock pulses unfreeze module 9, cause the letter G and the first letter O to be advanced one module, and modules 10-19 remain frozen as shown in FIG. 9(b)6. In FIG. 9(b)7, the next six clock pulses unfreeze module 10, cause the letters GOO to be advanced one module each, and modules 11–19 remain frozen. The remaining modules in the group 11 through 19 continue to be successively unfrozen by successive groups of six clock pulses un.l the entire message is in the double spaced form as initially presented, as seen in FIG. 9(b)8.

An alternative "freezing" mode of operation involves the use of a switching circuit 120 in the collector electrode circuit of transistor 54, as well as a switch 119. When switch 20 is in the freeze F position, no additional logic transfers or advances will occur in the "freeze control" circuit of FIG. 9*a*, thus letters or messages of various lengths may be frozen or unfrozen by controlling the closure time of 120 without the need for several separate $+V_C$ input conductors.

The conventional method for displaying a travelling (moving) or changing (but nonmoving) message on the sign is to control the illumination of the lamps on a column-by-column basis as hereinabove described. It may be desired, in the case of changing (but nonmoving) messages, to write the message on a row-by-row basis. The circuit of FIg. 10 illustrates an arrangement for obtaining this row-by-row writing. FIG. 10 illustrates three modules 21, 20, 19, having seven shift register circuits (seven rows of logic transfer circuits) per module, similar to the modules hereinabove described. The logic input ($V_{li1} \ldots V_{li7}$) to each row of logic transfer circuits in the first module (module 21) is generated in information circuit 24 and supplied by means of conductors 27 as in FIG. 1. However, as distinguishd from the modules in FIG. 1 wherein a single pulse generator and voltage switch circuit 32 is provided for all seven rows of logic transfer circuits on a particular display panel section or module, in FIG. 10 a separate pulse generator and voltage switch circuit (not shown) must be provided for each row of logic transfer circuits in one module. In FIG. 10, a switching circuit 123 is connected in the clock pulse input ($+V_{c1} - - - +V_{c7}$) circuits to the pulse generator and voltage switch circuits 32 associated with each row of logic transfer circuits. Switching circuit 123 includes six two-position switches, the nonactuated C position of the switches providing column-by-column writing, and the actuated R position providing row-by-row writing. The six switches are operated simultaneously in response to a signal generated in a "column-row" command control circuit 122 which may conveniently be located at the remote control console.

In the actuated R position of switching circuit 123, independent clock pulse $V_{C1\ to\ VC7}$ are supplied to each row. Thus, independent row-by-row control of logic switching is possible. If, for example, $V_{C2}$ to $V_{C7}$ clock pulses are not present, logic information will propagate only in the first row. After the first row is filled only $V_{C2}$ pulses might be allowed in order to fill the second row. This could be continued through the seventh row at which time the entire display would be filled to provide a nonmoving display. In changing the message, either particular rows could be moved out serially or all could be moved out simultaneously. For conventional operation as described in the copending application, the column-row switch 123 is switched to the column-by-column writing C position by automatic command signals, thus providing identical $V_C$ stepping pulses for all rows and providing normal column-by-column writing.

FIG. 11a illustrates a circuit for generating a new message while the old message is displayed on a changing (but nonmoving) message sign. This particular function is especially useful in minimizing the blank time between messages and can only be obtained with logic transfer circuitry wherein the logic and power carrying circuits are not common. Therefore, the logic transfer circuits 37 of FIG. 8 cannot obtain this "write while hold" feature since in such circuits, the logic and power carrying circuits are common. In FIG. 11*a*, a logic circuit 124 is similar in construction to the logic circuit portion of the logic transfer circuit illustrajted in FIG. 11 of the U.S. Pat. No. 3,384,888, and like numerals are employed to illustrate like terminals and elements in the two circuits. The distinctions between the two circuits are that the phase controlled lamp intensity control voltage $V_P$ is not supplied directly into logic circuit 124 and the logic output $V_{to}$ is connected in the gate electrode circuit of the power carrying solid state device 69. The circuit of FIG. 11a further includes a transformer 150, the ends of the secondary winding thereof being connected to the anodes of gate controlled solid state devices 151 and 152. The cathodes of devices 151 and 152 have a common juncture and are connected to lamp 66. The gate electrodes of devices 151 and 152 are supplied with the lamp intensity control voltage $V_P$. The center tap of the secondary of transformer 150 is connected to the cathode of lamp power carrying solid state device 69 to complete the power circuit therefor. A switching circuit comprising diode 153, switch 154 and direct current source 155, is connected across the serially connected lamp 66 and power carrying device 69. Switch 154 is a two-position switch having a nonactuated "normal" (N) position and an actuated "write while hold" (W) position. Switch 154 is operated in response to a signal generated in a "write while hold" command control circuit 156 which may conveniently be located at the remote control console.

The "write while hold" circuit operation will now be described with specific reference to FIGS. 11*a* and 11*b*.

Consider operation beginning at the time (t=0) when a displayed message is to be changed. "Write while hold" switch 154 is momentarily switched to the nonactuated N position (sufficient time for one or more power line zero crossings) which causes phase controlled lamp voltage $V_L$ to go to zero during the next power line voltage zero crossing. Thus, at t=0 all lamp power solid state devices such as 69 are commutated off. After switch 154 is switched to the actuated W position, a power switch turn-on pulse $V_{to}$ is applied to the anode of diode 141. Turn-on pulse $V_{to}$ is applied only once, upon automatic command, for each message change. Diode 141 will either be forward biased by $V_{to}$ (if logic circuit 124 previously was "on") or will remain reverse biased (if logic circuit 124 was previously "off"). If diode 141 is forward biased by $V_{to}$, current flows through the diode 141, resistor (170) and capacitor (171), thus turning on lamp power device 69, causing lamp 66 to illuminate. As long as switch 154 remains in the W position, lamp power device 69 will not commutate off since dc power source 155 will supply holding current (or voltage V hold) through diode 153 to device 69 durig intervals near the line voltage zero crossings.

Therefore, since lamp power device 69 can only be turned on during the time $V_{to}$ is present, and can only be turned off by interruption of dc power source 155, the logic circuit 124 can be processed with new information during the major time when the present message is displayed (switch 154 in W position).

In the particular arrangement shown in FIG. 11*a*, silicon controlled rectifiers 151, 152 and transformers 150 provide a variable voltage source $V_L$ (in response to $V_P$ control) for the lamps. Other power sources may be alternatively used such as full or half wave bridge rectifiers or unrectified ac voltage. An alternative circuit to FIG. 11*a* can use a capacitor in place of power source (155) and diode 153.

FIG. 12 is a perspective view of a structure which separates the illumination effects of adjacent lamps on the sign and also provides cooling of the lamps by natural convection. In addition to providing efficient heat removal by using the classical "chimney" approach, safe operating temperatures are provided for the electronic components which may necessarily by located in close poximity. Furthermore, temperature of the structure must be held to safe values to prevent burns in applications where viewers might be able to make contact with exposed surfaces. The particular structure illustrated in FIG. 12 is a cover member for a module which contains the six columns and seven rows of lamps hereinabove described, although the methods to be described are not limited to size, and number of rows or columns. The cover member is attached to the surface of the module on which the lamps are mounted, and electrically insulated therefrom by suitable conventional means, the lamps projecting in a perpendicular direction from such surface. Normally, the lamps will be mounted to a common plate, which will provide electrical connection directly to one side of the lamp socket, thus reducing the number of wires by half, and also providing a predictable and repeatable circuit. The cover member is constructed of a front and back cover plate member 160 and 161, respectively, arranged in parallel spaced-apart relationship. The cover plates and other elements of the cover member may be made of any suitable metal which is easy to work and a good thermal conductor such as aluminum. In addition, aluminum is lightweight, amenable to dipped brazing automatic methods of assembly. Furthermore, inexpensive methods for providing a desirable dull black finish for minimizig light leakage is easily accomplished by anodizing. The cover plates are each provided with 42 circular holes or apertures therethrough for enclosing portions of each of the 42 lamps within the cover member. Back member 161 is provided with suitable mounting means such as bracket members 167 for attaching the cover member to the surface of the module such that the 42 holes are aligned with the 42 lamps. The holes in front member 160 are slightly larger than the holes in back member 161 since the bulbs are normally only replaced from the front, the front member holes being as large as possible to obtain maximum area of illumination therefrom and still obtain a well defined separation of the illumination effects of adjacent lamps. Front and back members 160, 161 are also provided with a plurality of small slots 166 arranged in columns aligned with hereinafter described intervening plate members to provide a rugged means of accurate construction, amenable to automatic brazing methods. Seven intervening rectangular plate members 162 are connected to front and back members 160, 161 and are positioned in parallel arrangement along the length thereof to form six rectangular passageways running the full height of the cover member. The seven intervening plate members 162 are each slotted at six or eight equally spaced-apart points in the mid-section of the cover member. The slots 163 are in a direction perpendicular to the edge of the intervening plate members and have a depth to the mid-point thereof. The intervening late members 162 are provided with a corresponding plurality of tabs (not shown) of dimension sufficient to pass through the slots 166 in front and back memers 160, 161. These extending members pass through the slots when the cover member is assembled and are thence given a slight twist to provide a rigid assembly of the front, back, intervening members as well as insuring a high degree of accuracy in mechanical dimension and fit. The extending tabs may be retained to provide the function of cooling fins, or may be ground off to provide a smooth surface as on the front member 160 in FIG. 12. Six or eight intervening cross members 164 are also employed to provide additional light isolation between lamps in adjacent rows in each column and to provide additional structural rigidity. Thus, intervening members 162 and 164 respectively provide column and row separation of adjacent lamps. Intervening cross members 164 each consist of a rectangular plate of metal having six rectangular holes punched therethrough, the five portions of the plate between adjacent holes being slotted in a direction perpendicular to the edge of the intervening cross member such that the slots of the intervening members 162 and 164 are matched while assembling the cover member in eggcrate fashion. Thin aluminum tubes 165, of length approximately three-fourths of the distance between front and back members 160, 161 are attached to the edges of the circular holes in front member 160. Tubes 165 are highly polished to obtain high reflectance of the light emitted by the lamps which protrude through the circular holes in back member 161, and into tubes 165. The distance between front and back members 160, 161 is sufficient to obtain lamp protrusion to about two-thirds of this distance.

It is thus evident that the structure comprising intervening members 162 and front and back members 160, 161 forms six vertical channels through the cover member. These vertical channels should be optimized for thermal conduction paths and chimney effects, and yet should be as narrow as possible for maximum light isolation between adjacent lamps in each column thereof. The use of intervening cross members 164 is a compromise which permits use of maximum width of the vertical channels. It is to be understood that these cross members 164 are not essential since tubes 165 provide considerable light isolation of adjacent lamps but are used for s tructural reasons and ease of assembly. The vertically extending space between the end of tubes 165 and back member 161 forms the cooling path for the lamps. Circular plastic or glass inserts 168 may be provided within tubes 165 at the front edge thereof to diffuse the light produced by an illuminated lamp and thus produce a pleasing optical effect, particularly at close range and wide angle viewing. It plastic diffusion are used such as transluscent bottle caps 168, character formations are enhanced since the whole end of te cap is illuminated, and adjacent caps are essentially tangential to each other.

Moulded prismatic plugs provide increased optical efficiency in contrast to diffusers. Lamps normally are serviced from the front so the plugs, if employed, are designed to be removable.

The cover member of FIG. 12 can be manufactured by a variety of methods to provide low cost manufacture. A numerically controlled punch press such as a "Wedamatic" is well suited for obtaining the various holes and slots in the elements of the cover member, particularly since various size designs can be easily scaled from master tapes. After the punching process, the various elements are assembled and then dip brazed. The all-brazed unit is light, structurally rigid, strong, inexpensive in mass production and can be held to close dimensional tolerances. Several alternate designs are apparent. One in particular, uses only through tubes 165 and front and rear plates, again all brazed construction. In some applications with reflector type bulbs, it may be satisfactory to use the normal square egg-crate without the round tubes, in which case the vertical air hole dimensions are so designed as to block off the light from the filament towards the front of the module, but open towards the rear.

From the foregoing description, it can be appreciated that our invention makes available a plurality of circuits which are especially useful in illuminated diaplay signs to produce specific optical effects. Each of the operations of the circuits which produce the desired optical effects described are normally automatically controlled by being programmed in the information input to information circuit 24. The light emitting diode optical link system, or like systems employing nonoptical links, also finds use in the broader field of data transmission systems.

Having described a number of specific embodiments or our apparatus, it is believed obvious that modification and variation of our invention is possible in the light of the above teachings. Thus, the various circuits and optical effects produced thereby, although described with specific reference to the solid state display sign described in the above-identified patents, may also be employed in any other display sign wherein logic transfer circuits of any type are employed for transmitting the information across the sign. Also, the light emitting diode optical link system described may be used with other more conventional single channel links in place of the optical link as described hereinabove. An advantage of the single channel link system is that only one transmitter need be employed in either case wherein the remotely located receivers are at one or more remote points. Finally, various of the optical effects can be employed sequentially, simultaneously, or in combinations thereof, as desired, by appropriate programming in the information input. A specific example of the combination of these optical effects is the periodic or indiscriminate insertion of a nonrecurring message via an optional direct entry input along a selected portion of the sign while a nomal recurring or otherwise programmed message is travelling on the remainder of the sign. The nonrecurring message could be a time and/or temperature or news bulletin. This nonrecurring message is inserted by the optional input mechanism in the selected portion of the sign after that portion has been automatically cleared of any characters at the fastest rate possible. The resultant nonrecurring message display can be varied in intensity, speed of travel (if the message or individual characters thereof are recirculated in the selected sign portion) including zero speed, while the normal (recurring) message is tunneled around this seledted sign portion. A similar procedure (fast clearing) and fast advance may then be employed to return the state of the sign to its normal recurring message display without loss of any portion thereof. It is, therefore, to be understood that changes may be made in the particular embodiments described which are within the fulll intended scope of the invention as defined by the following claims.

What we claim as new and desire to secure by Letters Patent of the United States is:

1. In an illuminated traveling message display sign system the combination of a predetermined number of lamps mounted in a desired arrangement on a first display panel, a predetermined number of lamps mounted in said desired arrangement on a second display panel located remote from said first panel, and means for providing an optical link between said first and second display panels whereby logic representing a moving illuminated display on said first panel is transferred to said second panel by wireless means, said optical means comprising a time-share transmitter including a triggered pulse generator circuit for converting data including the moving illuminated display logic in parallel electrical pulse form to serial electrical pulse form, an optical transmitter including a light emitting diode, input to said diode connected to an output of the pulse generator circuit whereby the data in serial electrical pulse form is transmitted by said diode in optical pulse form, an optical receiver located remote from said optical transmitter, said optical receiver including a photoelectric device for detecting the optical output of said optical transmitter and converting the detected output into serial electrical pulse form, and a time-share receiver connected to an output of the photoelectric device for converting the output thereof to data in parallel electrical pulse form.

2. In the illuminated traveling message display sign system set forth in claim 1 wherein said time-share transmitter comprises a first one-shot multivibrator circuit, a first flip-flop circuit which is triggered into oscillatory operation by said first multivibrator circuit, a second one-shot multivibrator circuit, said second multivibrator circuit connected to an output of said first flip-flop circuit, a multistage parallel-to-serial converter for converting data in parallel electrical pulse form to serial electriclal pulse form, output of said second multivibrator circuit connected to said parallel-to-serial converter for advancing the converter one stage at a time, a first logic AND circuit, output of said first flip-flop circuit connected to a first input of said AND circuit, output of said converter connected to a second input of said AND circuit, and said triggered pulse generator circuit provided with a first and second input, output of said first flip-flop circuit connected to said first pulse generator circuit input for supplying receiver synchronizing pulses thereto, output of said first AND circuit connected to said second pulse generator circuit input for supplying the data in serial electrical pulse form thereto wherein the receiver synchronizing pulses and data pulses are time separated.

3. In the illuminated traveling message display sign system set forth in claim 1 wherein said time-share receiver comprises a third one-shot multivibrator circuit, said third multivibrator circuit coupled to the output of said photoelectric device, output of said third multivibrator circuit including time separated receiver synchronizing and data pulses, a fourth one-shot multivibrator circuit, said fourth multivibrator circuit triggered into operation by the receiver synchronizing pulse output from said third multivibrator circuit, a second flip-flop circuit which is reset by the output of said fourth multivibrator circuit and is set by the output of said third multivibrator circuit, a second logic AND circuit, output of said third multivibrator circuit connected to a first input of said second AND circuit, output of said second flip-flop circuit connected to a second input of said second AND circuit, and a multistage serial-to-parallel converter, output of said second AND circuit comprising time separated data pulses connected to the serial input of said serial-to-parallel converter, output of said second flip-flop circuit connected to said serial-to-parallel converter for advancing the converter one stage at a time whereby the output of said serial-to-parallel converter comprises data in parallel electrical pulse form.

4. A light emitting diode optical link system comprising a time-share transmitter including a triggered pulse generator circuit for converting data in parallel electrical pulse form to serial electrical pulse form, an optical transmitter including a light emitting diode, input to said diode connected to an output of the pulse generator circuit whereby the data in serial electrical pulse form is transmitted by said diode in optical pulse form, an optical receiver located remote from said optical transmitter, said optical receiver including a photoelectric device for detecting the optical output of said optical transmitter and converting the detected output into serial electrical pulse form, and a time-share receiver connected to an output of the photoelectric device for converting the output thereof to data in parallel electrical pulse form, said time-share tranmitter comprising a first one-shot multivibrator circuit, a triggered square-wave generator circuit which is triggered into oscillatory operation by said first multivibrator circuit, a second one-shot multivibrator circuit, said second multivibrator circuit connected to an output of said triggered square-wave generator circuit, a multistage parallel-to-serial converter for converging data in parallel electrical pulse form to serial electrical pulse form, output of said second multivibrator circuit connected to said parallel-to-serial converter for advancing the converter one stage at a time, a first logic AND circuit, output of said triggered square-wave generator circuit connected to a first input of said AND circuit, output of said converter connected to a second input of said AND circuit, and said triggered pulse generator circuit provided with a first and second input, output of said triggered square-wave generator circuit connected to said first pulse generator circuit input for supplying receiver synchronizing pulses thereto, output of said first AND circuit connected to said second pulse generator circuit input for supplying the data in serial electrical pulse form thereto wherein the receiver synchronizing pulses and data pulses are time separated.

5. A light emitting diode optical link system comprising a time-share transmitter including a triggered pulse generator circuit for converting data in parallel electrical pulse form to serial electrical pulse form, an optical transmitter including a light emitting diode, input to said diode connected to an output of the pulse generator circuit whereby the data in serial electrical pulse form is transmitted by said diode in optical pulse form, an optical receiver located remote from said optical transmitter, said optical receiver including a photoelectric device for detecting the optical output of said optical transmitter and converting the detected output into serial electrical pulse from, and a time-share receiver connected to an output of the photoelectric device for converting the output thereof to data in parallel electrical pulse form, said time-share receiver comprising a first one-shot multivibrator circuit, said first multivibrator circuit coupled to the output of said photoelectric device, output of said first multivibrator circuit including time separated receiver synchronizing and data pulses, a second one-shot multivibrator circuit, said second multivibrator circuit triggered into operation by the receiver synchronizing pulse output from said first multivibrator circuit, a first flip-flop circuit which is reset by the output of said second multivibrator circuit and is set by the output of said first multivibrator circuit, a first logic AND circuit, output of said first multivibrator circuit connected to a first input of said first AND circuit, output of said first flip-flop circuit connected to a second input of said first AND circuit, and a multistage serial-to-parallel converter, output of said first AND circuit comprising time separated data pulses connected to the serial input of said serial-to-parallel converter, output of said first flip-flop circuit connected to said serial-to-parallel converter for advancing the converter one stage at a time whereby the output of said serial-to-parallel converter comprises data in parallel electrical pulse form.

* * * * *